US009691283B2

(12) United States Patent
Maruoka et al.

(10) Patent No.: US 9,691,283 B2
(45) Date of Patent: *Jun. 27, 2017

(54) OBSTACLE ALERT DEVICE

(75) Inventors: Tetsuya Maruoka, Anjo (JP); Akira Kadoya, Kitanagoya (JP); Keigo Ikeda, Anjo (JP)

(73) Assignee: AISIN SEIKI KABUSHIKI KAISHA, Aichi (JP)

( * ) Notice: Subject to any disclaimer, the term of this patent is extended or adjusted under 35 U.S.C. 154(b) by 270 days.

This patent is subject to a terminal disclaimer.

(21) Appl. No.: 14/237,451

(22) PCT Filed: Nov. 1, 2011

(86) PCT No.: PCT/JP2011/075124
§ 371 (c)(1),
(2), (4) Date: Feb. 6, 2014

(87) PCT Pub. No.: WO2013/065119
PCT Pub. Date: May 10, 2013

(65) Prior Publication Data
US 2014/0198214 A1 Jul. 17, 2014

(51) Int. Cl.
*G08G 1/16* (2006.01)
*B62D 15/02* (2006.01)
(Continued)

(52) U.S. Cl.
CPC ............... *G08G 1/165* (2013.01); *B60R 1/00* (2013.01); *B62D 15/0295* (2013.01);
(Continued)

(58) Field of Classification Search
CPC .............. B60R 1/00; B60R 2300/8033; B60R 2300/8093; B60R 2300/304;
(Continued)

(56) References Cited

U.S. PATENT DOCUMENTS 9,041,806 B2 * 5/2015 Baur ........................ B60R 1/00
340/903
2006/0287825 A1 * 12/2006 Shimizu ................. B60K 35/00
701/516
(Continued)

FOREIGN PATENT DOCUMENTS

CN 101877177 A 11/2010
JP 11-115660 A 4/1999
(Continued)

OTHER PUBLICATIONS

English translation of International Preliminary Report on Patentability for PCT/JP2011/075124 dated May 15, 2014.
(Continued)

*Primary Examiner* — Tung Vo
(74) *Attorney, Agent, or Firm* — Sughrue Mion, PLLC

(57) ABSTRACT

An obstacle alert device notifies a driver of the presence of an obstacle approaching a vehicle without making it difficult to see a state of the periphery of the vehicle. The apparatus includes: a captured image obtainment unit that obtains a captured image of a scene of the periphery of the vehicle; a target captured image generation unit that generates a target captured image based on the captured image; an object presence determination unit that determines whether or not an object is present in an outside region that is on an outer side of the target captured image; a movement direction determination unit that determines a movement direction of the object in the outside region; and a notification image output unit that, in the case where the movement direction determination unit has determined that the object in the outside region is moving toward the center of the target captured image, sequentially displays a plurality of indicators, that appear for a set amount of time and then disappear, in different locations of the target captured image, starting with the side having the outside region in which the object (Continued)

is present and moving toward the center of the target captured image, and repeats this display while displaying the plurality of indicators in positions where the indicators partially overlap with each other, with the indicator displayed later being displayed over the indicator displayed immediately previous thereto at the areas where the indicators overlap.

5 Claims, 6 Drawing Sheets

(51) Int. Cl.
    *B60R 1/00*     (2006.01)
    *G06K 9/00*     (2006.01)
    *H04N 7/18*     (2006.01)

(52) U.S. Cl.
    CPC ......... *G06K 9/00805* (2013.01); *G08G 1/166* (2013.01); *G08G 1/168* (2013.01); *H04N 7/183* (2013.01); *B60R 2300/304* (2013.01); *B60R 2300/307* (2013.01); *B60R 2300/806* (2013.01); *B60R 2300/8033* (2013.01); *B60R 2300/8093* (2013.01)

(58) Field of Classification Search
    CPC ..... B60R 2300/806; B60R 1/66; B60R 1/168; B60R 2300/307; H04N 7/183; H04N 7/18; G06K 9/00805
    USPC ........................................................ 348/148
    See application file for complete search history.

(56) References Cited

U.S. PATENT DOCUMENTS

| | | | |
|---|---|---|---|
| 2006/0287826 A1* | 12/2006 | Shimizu | B60K 35/00 701/431 |
| 2007/0132567 A1* | 6/2007 | Schofield | B60C 23/00 340/438 |
| 2010/0071471 A1* | 3/2010 | Matsumoto | G01S 7/527 73/627 |
| 2012/0062743 A1* | 3/2012 | Lynam | B60Q 9/005 348/148 |
| 2012/0133769 A1 | 5/2012 | Nagamine et al. | |
| 2012/0154591 A1* | 6/2012 | Baur | B60R 1/00 348/148 |
| 2012/0296523 A1 | 11/2012 | Ikeda et al. | |
| 2015/0042799 A1* | 2/2015 | Zhang | H04N 7/18 348/148 |
| 2015/0109444 A1* | 4/2015 | Zhang | B60Q 9/008 348/148 |
| 2015/0251602 A1* | 9/2015 | Baur | B60R 1/00 348/148 |

FOREIGN PATENT DOCUMENTS

| | | |
|---|---|---|
| JP | 200184500 A | 3/2001 |
| JP | 2007221200 A | 8/2007 |
| JP | 2008-257378 A | 10/2008 |
| JP | 2009-40272 A | 2/2009 |
| JP | 2009-217740 A | 9/2009 |
| JP | 2009-265803 A | 11/2009 |
| JP | 2010-9607 A | 1/2010 |
| JP | 2011-35777 A | 2/2011 |
| JP | 2011-151479 A | 8/2011 |

OTHER PUBLICATIONS

International Search Report for PCT/JP2011/075124 dated Dec. 13, 2011.

Communication dated Apr. 13, 2015 from the State Intellectual Property Office of People's Republic of China in counterpart Application No. 201180072916.2.

* cited by examiner

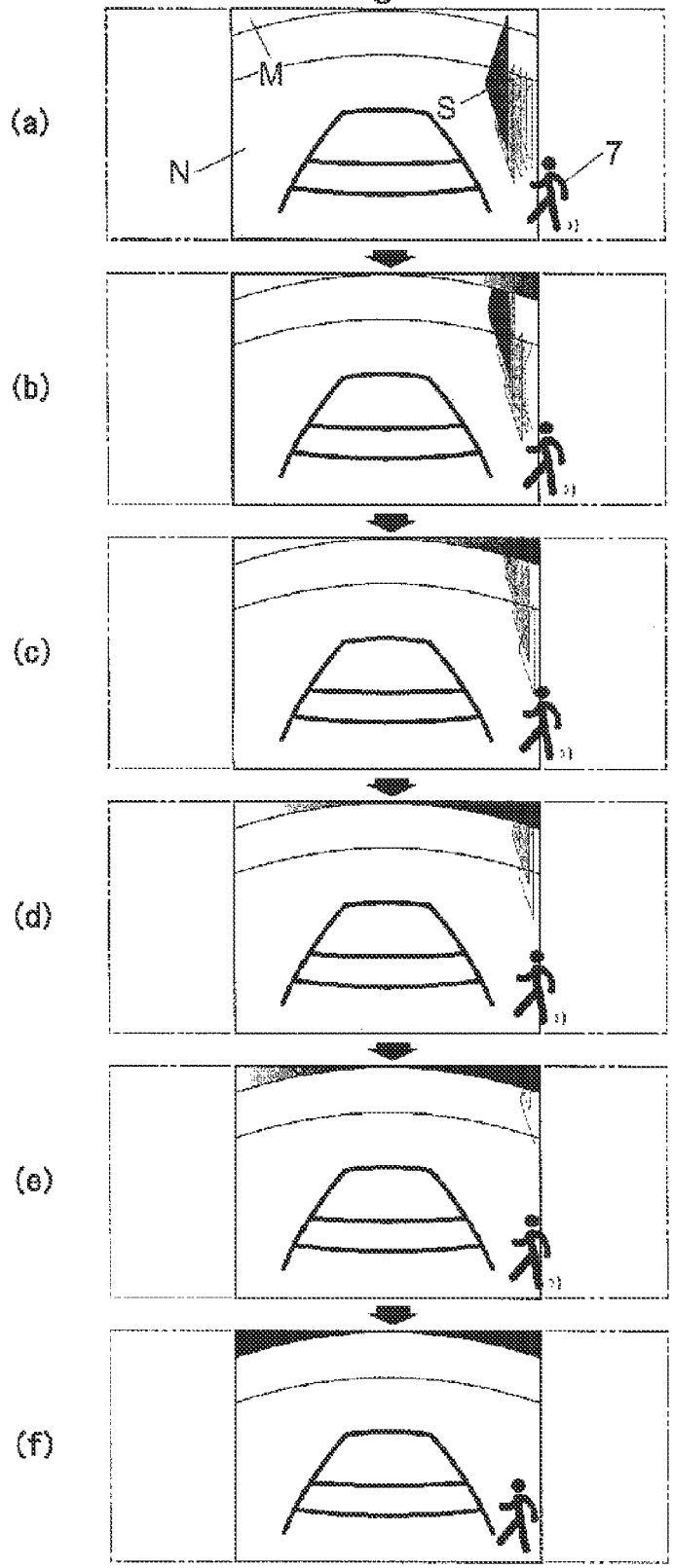

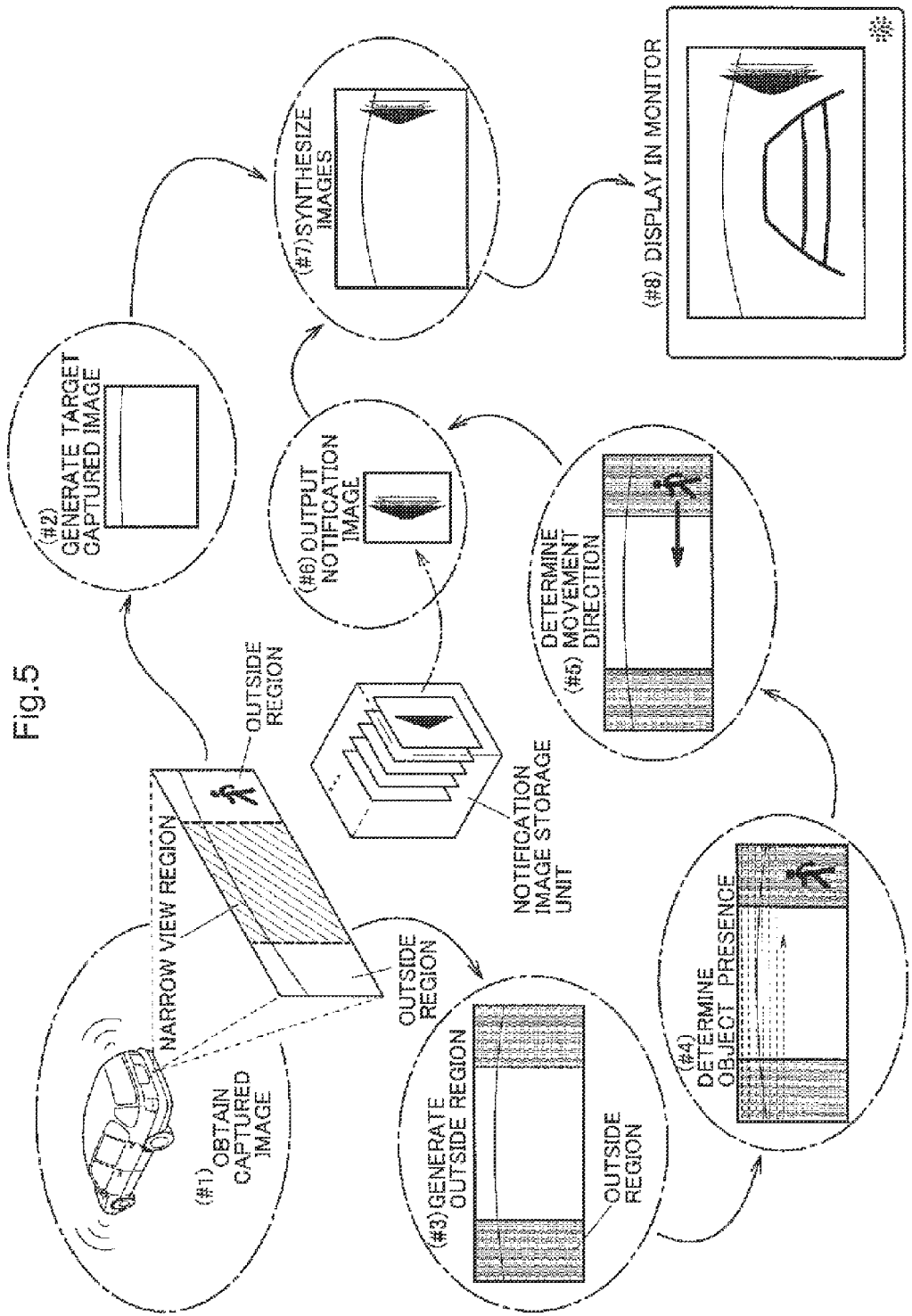

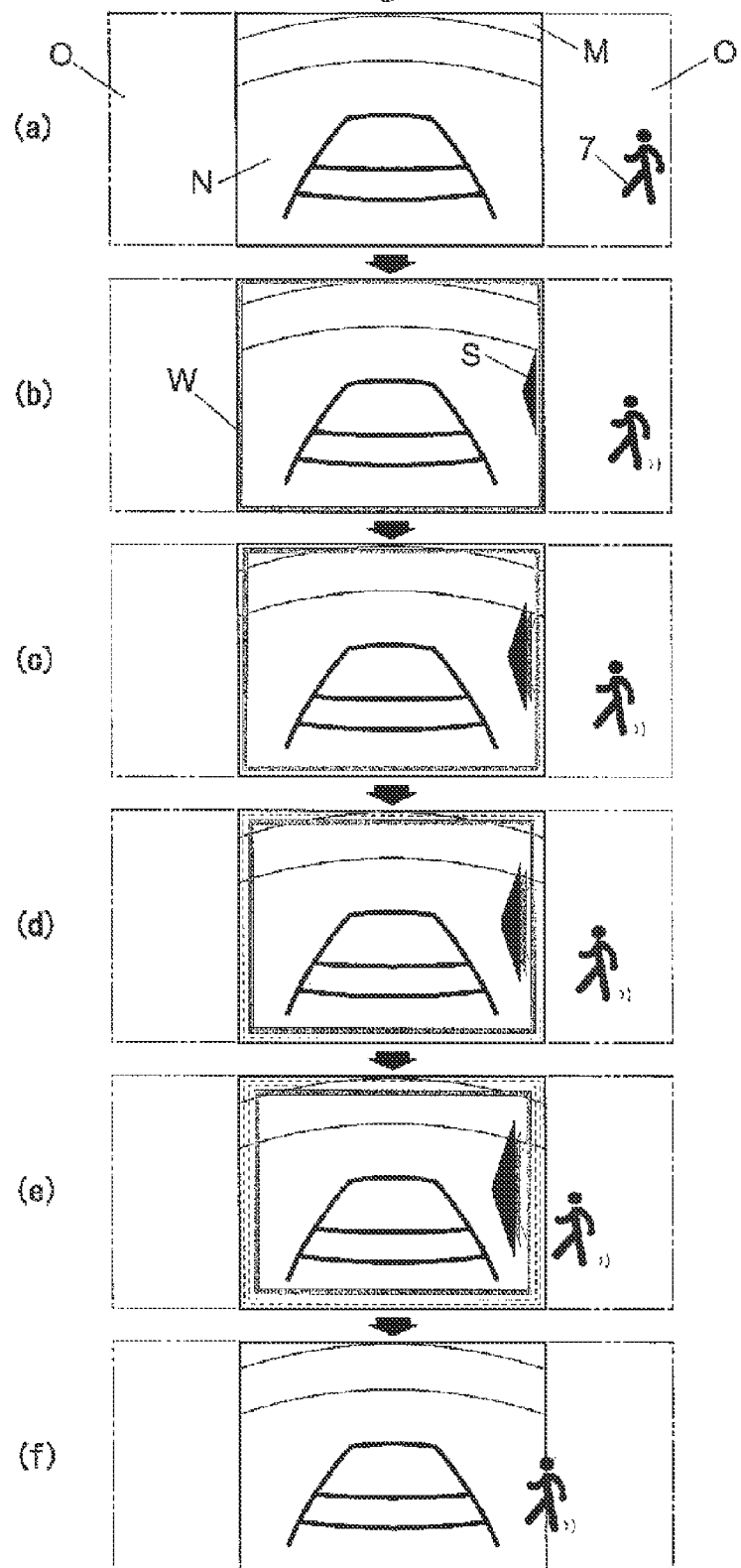

OBSTACLE ALERT DEVICE

CROSS REFERENCE TO RELATED APPLICATIONS

This application is a National Stage of International Application No. PCT/JP2011/075124 filed Nov. 1, 2011, the contents of which are incorporated herein by reference in their entirety.

TECHNICAL FIELD

The present invention relates to obstacle alert devices that alert occupants in a vehicle of the presence of nearby obstacles.

BACKGROUND ART

A vehicle's periphery contains blind spots that cannot be seen from a driver's position, and it is thus necessary for drivers to pay careful attention to the vehicle's periphery when driving the vehicle. Many drivers feel they are unskilled at parking vehicles in general, and thus experience significant emotional stress particularly when backing a vehicle into a parking spot. In light of this, techniques that monitor a vehicle's periphery for obstacles have been used for some time (for example, see Patent Documents 1 and 2).

Patent Document 1 discloses an obstacle alert device for a vehicle, configured of a laterally-moving obstacle detection means, a lateral movement direction detection means, and a lateral movement information presenting means. The laterally-moving obstacle detection means detects an obstacle, in front of the vehicle, moving in a direction that crosses the direction in which the vehicle is moving. The lateral movement direction detection means detects the direction of the lateral movement of the obstacle detected by the laterally-moving obstacle detection means. The lateral movement information presenting means presents, to a driver, information regarding the direction of the lateral movement of the obstacle detected by the lateral movement direction detection means. Here, the lateral movement information presenting means displays an arrow indicating the direction of the lateral movement detected by the lateral movement direction detection means in a display unit.

Patent Document 2 discloses a vehicle periphery monitoring device configured of an imaging means, an obstacle detecting means, and a display means. The imaging means captures an image of the vehicle's periphery, including part of the vehicle itself. The obstacle detecting means detects an obstacle located in the vehicle's periphery and calculates a distance between the detected obstacle and the vehicle. The display means displays the image captured by the imaging means and an obstacle display image indicating the distance calculated by the obstacle detecting means in a single screen.

PRIOR ART DOCUMENTS

Patent Documents

Patent Document 1: JP H11-115660A
Patent Document 2: JP 2009-217740A

DISCLOSURE OF THE INVENTION

Problem to be Solved by the Invention

By detecting an obstacle in the vehicle's periphery and displaying information (an arrow or the like) indicating that obstacle in a screen, techniques such as those disclosed in Patent Document 1 and Patent Document 2 enable a driver to be aware of the presence of obstacles in the vehicle's periphery. However, displays (display means) mounted in vehicles do not have large screens. As such, when an arrow or the like is displayed in an image indicating the state of the vehicle's periphery in a display, it may be difficult to see the state of the vehicle's periphery, the driver may be unable to notice the obstacle, and so on.

Having been achieved in light of the aforementioned problem, it is an object of the present invention to provide an obstacle alert device capable of notifying a driver of an obstacle approaching a vehicle without making it difficult to see the state of the vehicle's periphery.

Means for Solving Problem

To achieve this object, a characteristic configuration of an obstacle alert device according to the present invention includes: a captured image obtainment unit that obtains a captured image of a scene of the periphery of a vehicle; a target captured image generation unit that generates a target captured image based on the captured image; an object presence determination unit that determines whether or not an object is present in an outside region that is on an outer side of the target captured image; a movement direction determination unit that determines a movement direction of the object in the outside region; and a notification image output unit that, in the case where the movement direction determination unit has determined that the object in the outside region is moving toward the center of the target captured image, sequentially displays a plurality of indicators, that appear for a set amount of time and then disappear, in different locations of the target captured image, starting with the side having the outside region in which the object is present and moving toward the center of the target captured image, and repeats this display while displaying the plurality of indicators in positions where the indicators partially overlap with each other, with the indicator displayed later being displayed over the indicator displayed immediately previous thereto at the areas where the indicators overlap.

According to this characteristic configuration, even if the object has not yet appeared in a screen of a display device (for example, a monitor) provided in the vehicle, a driver of the vehicle can be notified of the presence and direction of the object approaching the vehicle at the point in time when the object approaching the vehicle has entered a captured range, while at the same time displaying the state of the periphery of the vehicle. Accordingly, the driver will not fail to see the object approaching the vehicle even in the case where the display device has a small screen. Furthermore, because the indicator is displayed in an end area of the screen, it is not difficult for the driver to see the state of the periphery of the vehicle. Accordingly, the driver can be notified of the presence of an obstacle (the object) approaching the vehicle without the state of the periphery of the vehicle being difficult to see. Furthermore, the indicator can be displayed so as to move toward the center of the screen. Accordingly, it is easier for the driver to instinctively recognize that the obstacle is approaching.

Here, it is preferable for the indicator displayed later to be displayed at a larger size than the indicator displayed immediately previous thereto.

According to this configuration, the indicator moving toward the center of the screen can be displayed in a more visual manner. Accordingly, it is easier for the driver to effectively recognize that the obstacle is approaching.

Here, it is preferable for the indicator displayed later to be displayed at a lower level of transparency than the indicator displayed immediately previous thereto.

According to this configuration, the indicator moving toward the center of the screen can be displayed in a more visual manner. Accordingly, it is easier for the driver to effectively recognize that the obstacle is approaching. Furthermore, the scene displayed at the end area of the screen is not hidden, and thus the obstacle can be recognized appropriately even in the case where the obstacle has jumped out suddenly.

Here, it is preferable for the indicator to be configured in an arrow shape whose point protrudes toward the center of the target captured image.

According to this configuration, the movement direction of the obstacle matches the direction in which the arrow protrudes, and thus the driver can instinctively recognize the movement direction of the obstacle.

Here, it is preferable for the notification image output unit to be configured to stop the output of the indicator in the case where the object has advanced into a region corresponding to the target captured image.

According to this configuration, the display of the indicator can be stopped at the point in time when the object has appeared in the screen of the display device (that is, the display image), and thus the object will not be hidden by the indicator. Accordingly, the driver can appropriately view the object that has approached the vehicle.

BRIEF DESCRIPTION OF THE DRAWINGS

FIG. 4 is a diagram illustrating an example of a synthesized image.

FIG. 5 is a diagram schematically illustrating processing performed by the obstacle alert device.

FIG. 6 is a diagram illustrating a synthesized image according to another embodiment.

BEST MODE FOR CARRYING OUT THE INVENTION

Hereinafter, embodiments of the present invention will be described in detail. An obstacle alert device 100 according to the present invention includes functionality for notifying a driver that an object is approaching a vehicle in such a case where an object is approaching a vehicle. This will be described hereinafter using the drawings.

Figure 1:
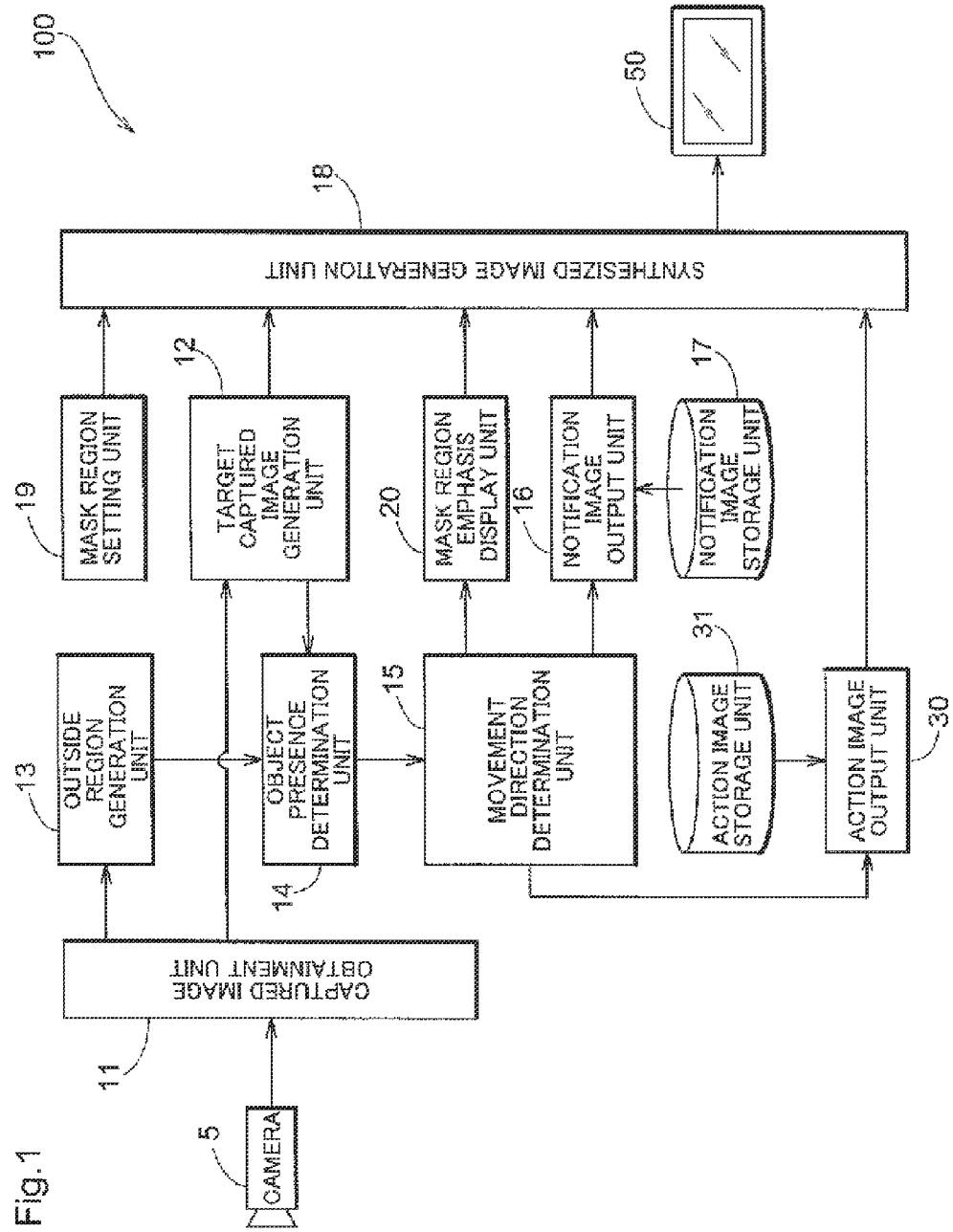
FIG. 1 is a block diagram schematically illustrating the configuration of an obstacle alert device.

FIG. 1 is a block diagram schematically illustrating the configuration of the obstacle alert device 100. As shown in FIG. 1, the obstacle alert device 100 is configured of functional units including a captured image obtainment unit 11, a target captured image generation unit 12, an outside region generation unit 13, an object presence determination unit 14, a movement direction determination unit 15, a notification image output unit 16, a notification image storage unit 17, a synthesized image generation unit 18, a mask region setting unit 19, a mask region emphasis display unit 20, an action image output unit 30, and an action image storage unit 31. The functional units are constructed of hardware, software, or both, and function with a CPU serving as a core member, so as to perform various processes for notifying a driver of a vehicle 1 that an object 7 is approaching.

Figure 2:
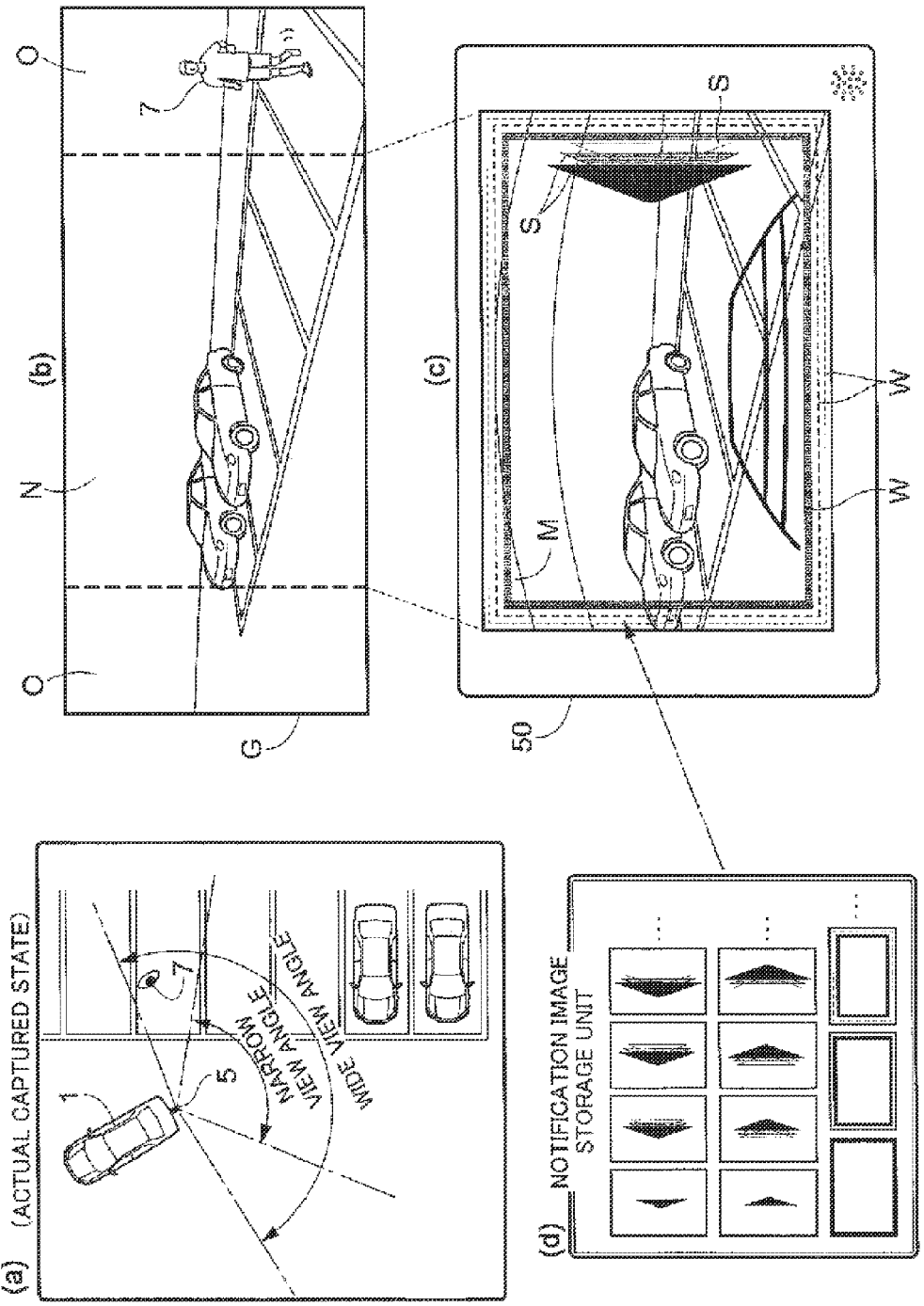
FIG. 2 is a diagram illustrating an example of processing performed by the obstacle alert device.

The captured image obtainment unit 11 obtains a captured image G showing a scene of the periphery of the vehicle 1. The vehicle 1 is provided with a camera 5. The camera 5 according to the present embodiment is configured of a digital camera that includes an image sensor such as a CCD (charge coupled device) or a CIS (CMOS image sensor) and that outputs captured data as moving picture data. As shown in FIG. 2(a), the camera 5 is installed near the license plate on an outer rear area of the vehicle 1, near an emblem on the outer rear area of the vehicle 1, or the like, facing rearward from the vehicle 1 at a slight downward angle. The camera 5 is configured having a wide-angle lens (not shown). As such, the scene of the periphery of the vehicle 1 can be captured across an approximately 180-degree range behind the vehicle 1. This captured range is indicated as a "wide view angle" in FIG. 2(a). The camera 5 has the capability to output a real-time moving picture as the captured image G. The captured image G is transferred to the captured image obtainment unit 11.

FIG. 2(b) illustrates an example of the captured image G. The total width in FIG. 2(b) corresponds to the wide view angle of FIG. 2(a). An image inversion process is carried out on the captured image G so that the object 7, which as shown in FIG. 2(a) is located on the left side when viewed from the back of the vehicle 1, is displayed on the right side in the captured image G, as shown in FIG. 2(b). This makes it easier for the driver of the vehicle 1 to visually grasp whether the object 7 in the captured image G is on the left side or the right side of the vehicle 1 when the scene to the rear of the vehicle 1 is displayed in a monitor 50.

Returning to FIG. 1, the target captured image generation unit 12 generates a target captured image based on the captured image G. In the present embodiment, the captured range of the captured image G corresponds to the wide view angle. Accordingly, the target captured image generation unit 12 generates a narrow view region N, which corresponds to a central area of the captured image G, as the target captured image. The captured image G is transferred from the captured image obtainment unit 11 mentioned earlier. In the present embodiment, the target captured image corresponds to the central area of the captured image G in the horizontal direction, as shown in FIG. 2(b). It is preferable for the narrow view region N to be a region covering, for example, approximately 120 to 130 degrees to the rear of the vehicle 1, as indicated by "narrow view angle" in FIG. 1(a). Meanwhile, the narrow view region N is close to a possible range of travel when the vehicle 1 is traveling in reverse and as such is a region in the captured image G that should be given particular attention; hence the region is labeled the "target captured image". The target captured image corresponds to a display image displayed in the monitor 50, which will be mentioned later (see FIG. 2(c)). Note that the present embodiment is described assuming that the "target captured image" is an image of the "narrow view region".

The outside region generation unit 13 generates an outside region O, on the outside of the target captured image. That is, the outside region O is generated corresponding to the areas of the captured image G that are outside the narrow view region N. As described above, the narrow view region N is generated by the target captured image generation unit 12, in the central area of the captured image G in the horizontal direction. The outside region generation unit 13 generates the outside region O as shown in FIG. 2(b), on the outside of the narrow view region N in the horizontal direction. The outside region O generated by the outside region generation unit 13 is transferred to the object presence determination unit 14, described below.

The object presence determination unit 14 determines whether or not the object 7 is present in the outside region O. The outside region O is transferred from the outside region generation unit 13. Determining whether or not the object 7 is present can be performed using a known image recognition process, such as pattern matching, for example. Of course, whether or not the object 7 is present in the outside region O can be determined through a process aside from pattern matching. A result of the determination performed by the object presence determination unit 14 is transferred to the movement direction determination unit 15, described below.

The movement direction determination unit 15 determines a movement direction of the object 7 in the outside region O. This movement direction determination is performed in the case where the object presence determination unit 14 has determined that the object 7 is present in the outside region O. More specifically, in the present embodiment, the movement direction determination unit 15 determines whether or not the object 7 in the outside region O is moving toward the narrow view region N. "Moving toward the narrow view region N" refers to movement in a direction from an area outside the immediate rear of the vehicle 1 in the width direction thereof, toward an area immediately behind the vehicle 1. This determination can be performed by, for example, comparing the position of the object 7 in the current captured image G with the position of the object 7 in a captured image G from a predetermined amount of time previous, or by using a known method such as using an optical flow. A result of the movement direction determination is transferred to the notification image output unit 16, described below.

In the case where the movement direction determination unit 15 has determined that the object 7 in the outside region O is moving toward the center of the target captured image, the notification image output unit 16 sequentially displays an indicator S, that appears for a set amount of time and then disappears, in different locations of the target captured image, starting with the side having the outside region O in which the object 7 is present and moving toward the center, and repeats this display. In the present embodiment, the target captured image corresponds to an image of the narrow view region N. Accordingly, in the case where the object 7 in the outside region O is moving toward the narrow view region N of the vehicle 1, the notification image output unit 16 sequentially displays the indicator S, that appears for a set amount of time and then disappears, in different locations of the narrow view region N, starting with the side having the outside region O in which the object 7 is present and moving toward the center, and repeats this display. Whether or not the object 7 in the outside region O is moving toward the narrow view region N of the vehicle 1 is determined by the movement direction determination unit 15, described above. The narrow view region N on the side of the outside region O in which the object 7 is present corresponds to the left side of the narrow view region N in the case where the object 7 is in the outside region O on the left side. Likewise, this corresponds to the right side of the narrow view region N in the case where the object 7 is in the outside region O on the right side.

The "indicator S that appears for a set amount of time and then disappears" refers to a state in which the indicator S is not continually displayed, but rather in which the indicator S is blinking. In the present embodiment, when the indicator S is displayed, removed, and then once again displayed, the indicator S is displayed in a different position. Accordingly, the indicator S moves between two predetermined positions in the screen while blinking. The notification image output unit 16 repeats the movement of the indicator S while causing the indicator S to blink.

The indicator S will now be described. The indicator S according to the present embodiment is shaped as an arrow whose point protrudes toward the center of the target captured image (the narrow view region N). As indicated in FIG. 2(d), the indicator S is stored in the notification image storage unit 17. FIG. 2(c) indicates an image displayed in the monitor 50 of the vehicle 1 in the case of the captured image G shown in FIG. 2(b), or in other words, in the case where the object 7 is present in the outside region O on the right side. As shown in FIG. 2(c), a plurality of indicators S are displayed in the monitor 50 in the present embodiment. In this case, the plurality of indicators S are displayed in positions where respective indicators S partially overlap. In the present embodiment, "partially overlapping" refers to a part of one of the indicators S on the protruding side of the arrow shape overlapping with a part of another of the indicators S on the non-protruding side of the arrow shape. Furthermore, in the case where there are a plurality of indicators S, the area of overlap between one of the indicators S and the indicator S displayed immediately previous thereto is configured so that the indicator S displayed later is displayed over the indicator S displayed immediately previous thereto. In other words, the indicator S displayed later is positioned in a layer that is above the indicator S displayed immediately previous thereto. In the present embodiment, the indicator S displayed immediately previous is displayed at a higher level of transparency than the indicator S displayed later. In other words, the indicator S displayed later is displayed at a lower level of transparency than the indicator S displayed immediately previous. Accordingly, in the case where a plurality of the indicators S are displayed, the indicator S in the uppermost layer has the lowest level of transparency, and the indicator S in the lowermost layer has the highest level of transparency.

Furthermore, the indicator S displayed later has a larger size than the indicator S displayed immediately previous thereto. Accordingly, in the case where a plurality of the indicators S are displayed, the indicator S in the uppermost layer has the greatest size, and the indicator S in the lowermost layer has the smallest size. Note that the respective indicators S may be set having different sizes but having the same shape, or may be set so that the sizes are changed by changing one of the vertical length and horizontal length of the indicators S.

This display is repeated by the notification image output unit 16. In the present embodiment, the indicator S is synthesized with the target captured image, which corresponds to the narrow view region N, and is displayed in the monitor 50, as shown in FIG. 2(c). Accordingly, the synthesized image generation unit 18 generates a synthesized image in which the indicator S has been synthesized with the target captured image. Through this, an image such as that shown in FIG. 2(c) is generated.

Displaying the indicators S in this manner makes it possible for the indicators S to become progressively larger in the display. Through this, an occupant of the vehicle 1 can be visually notified that the object 7 is approaching the vehicle 1.

Furthermore, in the case where the movement direction determination unit 15 has determined that the object 7 in the outside region O is moving toward the center of the target captured image, the notification image output unit 16 sequentially displays a frame indicator W, that has a smaller outer shape than the contour of the target captured image and appears for a set amount of time and then disappears, in different positions moving from an outer edge area of the target captured image toward the center of the target captured image, and repeats that display. In the present embodiment, the target captured image corresponds to an image of the narrow view region N. Accordingly, in the case where the object 7 in the outside region O is moving toward the narrow view region N, the notification image output unit 16 sequentially displays the frame indicator W, that has a smaller outer shape than the contour of the narrow view region N and appears for a set amount of time and then disappears, in different positions moving from an outer edge area of the narrow view region N toward the center of the narrow view region N, and repeats that display. As described above, the target captured image, which corresponds to the narrow view region N, is displayed in the monitor 50. Accordingly, the frame indicator W having a smaller outer shape than the contour of the narrow view region N refers to the frame indicator W being smaller than the screen size of the monitor 50. Whether or not the object 7 in the outside region O is moving toward the narrow view region N of the vehicle 1 is determined by the movement direction determination unit 15, described above.

The "frame indicator W that appears for a set amount of time and then disappears" refers to a state in which the frame indicator W is not continually displayed, but rather in which the frame indicator W is blinking. In the present embodiment, when the frame indicator W is displayed, removed, and then once again displayed, the frame indicator W is displayed in a different position toward the center. Accordingly, the frame indicator W gradually becomes smaller in the display. The notification image output unit 16 repeats the movement of the frame indicator W while causing the frame indicator W to blink.

The frame indicator W will now be described. The frame indicator W according to the present embodiment is configured having a smaller outer shape than the contour of the target captured image (the narrow view region N). As shown in FIG. 2(c), a plurality of frame indicators W are displayed in the monitor 50 in the present embodiment. In this case, the frame indicator W displayed later has a smaller size than the frame indicator W displayed immediately previous thereto. Furthermore, the frame indicator W displayed later has a lower level of transparency than the frame indicator W displayed immediately previous thereto. This makes it possible to display the frame indicator W as if the frame indicator W is "jumping out" from the center of the screen. Note that as indicated in FIG. 2(d), the frame indicator W is stored in the notification image storage unit 17.

This display is repeated by the notification image output unit 16. In the present embodiment, the frame indicator W is synthesized with the target captured image, which corresponds to the narrow view region N, and is displayed in the monitor 50, as shown in FIG. 2(d). Accordingly, the synthesized image generation unit 18 generates a synthesized image in which the frame indicator W has been synthesized with the target captured image. Through this, an image such as that shown in FIG. 2(c) is generated.

The mask region setting unit 19 sets a mask region M that at least partially hides the scene in the periphery of the vehicle 1 shown in the target captured image. In the present embodiment, the mask region M is set to an upper area of the screen, or in other words, an upper area within the target captured image, as shown in FIG. 2(c). This mask region M is formed spanning across both sides of the target captured image in the horizontal direction. The mask region M is filled with a color such as black so that the scene above the vehicle 1 cannot be seen. Of course, another color may be used instead.

In the case where the object 7 in the outside region O has advanced into a region corresponding to the target captured image, or in other words, into the narrow view region N, the action image output unit 30 outputs an image into which a notification indicator is absorbed from the side of the mask region M on which the object 7 is present. Whether or not the object 7 in the outside region O has advanced into the narrow view region N is determined by the movement direction determination unit 15. The "notification indicator" corresponds to the indicator S displayed in the monitor 50 in the case where the object 7 has advanced into the narrow view region N. The "side of the mask region M on which the object 7 is present" corresponds to the right-side area of the mask region M in the case where the object 7 is present in the outside region O on the right side, and corresponds to the left-side area of the mask region M in the case where the object 7 is present in the outside region O on the left side. The "image into which a notification indicator is absorbed" is an image that causes the indicator S to be absorbed and disappear into the mask region M. This image is stored in advance in the action image storage unit 31.

Here, in the case where the object 7 has advanced into the narrow view region N, the object 7 is displayed in an end area of the target captured image. Accordingly, in the case where the object 7 has advanced into the narrow view region N, causing the indicator S to be absorbed into the mask region M makes it possible to display the object 7, which is displayed at the end area of the narrow view region N, without the object 7 being hidden by the notification indicator. Accordingly, the driver of the vehicle 1 can be appropriately notified of the presence of the object 7.

The action image output unit 30 is configured to change the display color of the mask region M from the position where the notification indicator is absorbed, as the notification indicator is absorbed into the mask region M. In other words, in the case where the notification indicator is absorbed from the right side of the mask region M, an image that colors the mask region M from the right side to the left side is outputted, whereas in the case where the notification indicator is absorbed from the left side of the mask region M, an image that colors the mask region M from the left side to the right side is outputted. Coloring the mask region M in this manner makes it possible to notify the driver of the vehicle 1 of the side into which the object 7 has advanced.

Figure 3:
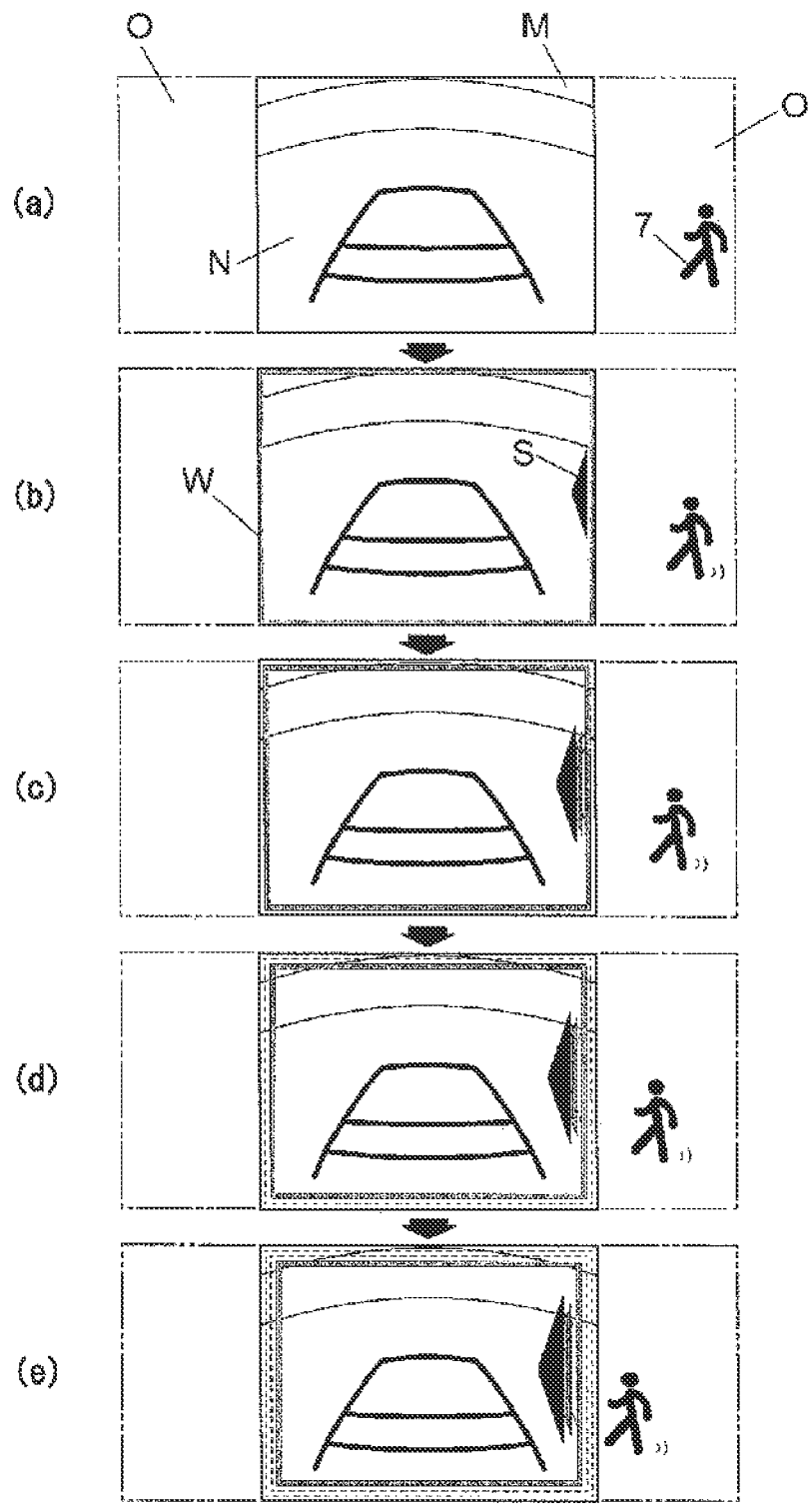
FIG. 3 is a diagram illustrating an example of a synthesized image.

FIG. 3 and FIG. 4 illustrate examples of series of images in which the notification indicator enters the mask region M and the mask region M is colored. FIG. 3 illustrates an example in which, in the case where the object 7 in the outside region O is moving toward the narrow view region N, the indicator S and the frame indicator W are displayed in an overlapping manner in the narrow view region N. As shown in FIG. 4(a), when the object 7 advances into the narrow view region N from the outside region O on the right side, the overlapping of the frame indicator W ends. Furthermore, as shown in FIGS. 4(b) to (e), the indicator S enters into the mask region M so as to be sucked into the mask region M on the right side. Along with this, the mask region M is gradually colored from the right side, with the entirety of the mask region M ultimately being colored (FIG. 4(f)).

Returning to FIG. 1, the mask region emphasis display unit 20 displays the mask region M with emphasis in the case where the object 7 in the outside region O has entered into a region corresponding to the target captured image, or in other words, into the narrow view region N. In the present embodiment, "displays with emphasis" refers to a blinking display. Whether or not the object 7 in the outside region O has advanced into the narrow view region N is determined by the movement direction determination unit 15. The mask region emphasis display unit 20 causes the mask region M to blink in response to a result of the determination performed by the movement direction determination unit 15. This makes it possible to visually notify the driver of the vehicle 1 that the object 7 is present in the narrow view region N.

Meanwhile, the mask region emphasis display unit 20 stops displaying the mask region M with emphasis in the case where the object 7 has left the region corresponding to the target captured image, or in other words, the narrow view region N. Whether or not the object 7 has left the narrow view region N can also be determined by the movement direction determination unit 15. In other words, the movement direction determination unit 15 can determine that the object 7 has left the narrow view region N if the object 7 enters into the outside region O from the side of the outside region O that is located toward the narrow view region N. This determination result is also transferred to the mask region emphasis display unit 20. In the present embodiment, the "display with emphasis" refers to a blinking display. Accordingly, when such a determination result is transferred, the mask region emphasis display unit 20 stops the mask region M from blinking. This makes it possible to visually notify the driver of the vehicle 1 that the object 7 is not present in the narrow view region N.

Next, a series of processes through which the obstacle alert device 100 displays the synthesized image in which a notification image is superimposed on the target captured image in the monitor 50 will be described using the schematic diagram shown in FIG. 5. First, the captured image obtainment unit 11 obtains the captured image G captured by the camera 5 of the vehicle 1 (step #1).

Next, the target captured image generation unit 12 generates the central area of the obtained captured image G as the target captured image (step #2). Meanwhile, the outside region generation unit 13 generates the areas on both sides of the obtained captured image G in the horizontal direction as the outside region O (step #3). Whether or not the object 7 is present in the outside region O generated in this manner is determined by the object presence determination unit 14 (step #4).

When it is determined that the object 7 is present in the outside region O, the movement direction determination unit 15 determines the movement direction of the object 7 (step #5). In the case where the object 7 is moving from the outside region O toward the narrow view region N that corresponds to the target captured image, the notification image is outputted by the notification image output unit 16 (step #6). This notification image is outputted having referred to the notification image stored in the notification image storage unit 17.

The synthesized image generation unit 18 generates the synthesized image by superimposing the notification image outputted in step #6 over the target captured image generated in step #2 (step #7). The generated synthesized image is then displayed in the monitor 50 (step #8). Displaying the target captured image at a large size in the monitor 50 in this manner makes it possible to cause the driver of the vehicle 1 to focus on the periphery of the vehicle 1, and to clarify the direction in which the object 7 is approaching the vehicle 1. This in turn enables the driver to understand the state of the periphery of the vehicle 1, and makes it possible to clarify that an obstacle is approaching.

Thus, according to the obstacle alert device 100 of the present invention, the driver can be notified of the presence and direction of the object 7 approaching the vehicle 1 at the point in time when the approaching object 7 has entered the captured range, while at the same time displaying the state of the periphery of the vehicle 1, even if the object 7 has not yet appeared in the screen of the monitor 50 provided in the vehicle 1. Accordingly, the driver will not fail to see the object 7 approaching the vehicle 1 even in the case where the monitor 50 has a small screen. Furthermore, because the indicator S is displayed in an end area of the screen, it is not difficult for the driver to see the state of the periphery of the vehicle 1. Accordingly, the driver can be notified of the presence of an obstacle (the object 7) approaching the vehicle 1 without the state of the periphery of the vehicle 1 being difficult to see.

Other Embodiments

The above embodiment describes the notification image output unit 16 as gradually increasing the display size of the blinking indicator S as the indicator S moves. However, the scope to which the present invention can be applied is not intended to be limited thereto. The indicator S can of course be displayed at the same size. Furthermore, it is of course possible to display the indicator S at a gradually decreasing display size. The driver of the vehicle 1 can be appropriately notified of the object 7 approaching the vehicle 1 even when such a configuration is employed.

The above embodiment describes the indicator S displayed immediately previous to an indicator S as having a higher level of transparency than the indicator S displayed thereafter. However, the scope to which the present invention can be applied is not intended to be limited thereto. For example, it is of course possible to display the indicator S displayed immediately previous at a lower level of transparency than the indicator S displayed thereafter, and possible to display the indicator S displayed immediately previous at the same level of transparency as the indicator S displayed thereafter.

In the case where there are a plurality of indicators S, the above embodiment describes displaying the plurality of indicators S in positions where the indicators S partially overlap. However, the scope to which the present invention can be applied is not intended to be limited thereto. It is possible to employ a configuration in which the indicators S do not overlap with each other in the case where a plurality of indicators S are displayed.

The above embodiment describes the indicator S as being shaped as an arrow whose point protrudes toward the center of the narrow view region N. However, the scope to which the present invention can be applied is not intended to be limited thereto. The indicator S can of course be configured having a different shape.

The above embodiment describes the action image output unit 30 as outputting an image into which the notification indicator is absorbed from the side of the mask region M on which the object 7 is present in the case where the object 7 in the outside region O has advanced into the narrow view region N. However, the scope to which the present invention can be applied is not intended to be limited thereto. It is also possible to employ a configuration in which the notification image output unit 16 stops the output of the indicator S in the case where the object 7 has advanced into the region corresponding to the target captured image (the narrow view region N), as shown in FIG. 6. Of course, in this case, it is also possible to employ a configuration in which the output of the frame indicator W is also stopped. Whether or not the object 7 has advanced into the narrow view region N is determined by the movement direction determination unit 15, described above. In the case where the object 7 has advanced into the narrow view region N, the object 7 is displayed in an end area of the target captured image. Accordingly, the object 7 displayed in the end area of the target captured image is not hidden by the notification image and can therefore be visually confirmed by the driver of the vehicle 1, even in the case where the output of the notification image is stopped in this manner.

The above embodiment describes a case where a plurality of the indicators S and the frame indicators W are displayed within the screen. However, the scope to which the present invention can be applied is not intended to be limited thereto. It is also possible to employ a configuration in which one each of the indicator S and the frame indicator W are displayed in the screen, as well as a configuration in which only the indicator S is displayed.

The above embodiment describes the determination as to whether or not the object 7 is present as capable of being performed using a known image recognition process, such as pattern matching, for example. However, the scope to which the present invention can be applied is not intended to be limited thereto. It is of course possible to detect the object 7 using sonar or the like, for example.

The above embodiment describes the target captured image generation unit 12 as generating the narrow view region N, which corresponds to a central area of the captured image G, as the target captured image. However, the scope to which the present invention can be applied is not intended to be limited thereto. For example, in the case where the captured image G has been obtained by the camera 5 having a narrow view angle that corresponds to the narrow view region N, it is of course possible to utilize the captured image G as the target captured image as-is. In this case, it is preferable to determine whether or not the object 7 is present in the outside region O using sonar detection or the like, as mentioned above.

INDUSTRIAL APPLICABILITY

The present invention can be applied in obstacle alert devices that alert occupants in a vehicle of the presence of nearby obstacles.

DESCRIPTION OF REFERENCE SIGNS

1: vehicle
7: object
11: captured image obtainment unit
12: target captured image generation unit
14: object presence determination unit
15: movement direction determination unit
16: notification image output unit
100: obstacle alert device
G: captured image
O: outside region
S: indicator

The invention claimed is:

1. An obstacle alert device comprising:
a captured image obtainment unit that obtains a captured image of a scene of the periphery of a vehicle;
a target captured image generation unit that generates a central area of the captured image as a target captured image;
an outside region generation unit that generates an outside region that is outside the target captured image in the captured image;
an object presence determination unit that determines whether or not an object is present in the outside region;
a movement direction determination unit that determines a movement direction of the object in the outside region; and
a notification image output unit that, in the case where the movement direction determination unit has determined that the object in the outside region is moving toward the center of the target captured image, sequentially displays a plurality of indicators, that appear for a set amount of time and then disappear, in different locations of the target captured image, starting with the side having the outside region in which the object is present and moving toward the center of the target captured image, and repeats this display while displaying the plurality of indicators in positions where the indicators partially overlap with each other, with the indicator displayed later being displayed over the indicator displayed immediately previous thereto at the areas where the indicators overlap,
wherein the notification image output unit displays the target captured image on a monitor of the vehicle, and
all of the indicators displayed later are superimposed on the indicator displayed immediately previous thereto on a screen of the monitor.

2. The obstacle alert device according to claim 1,
wherein the indicator displayed later has a larger size than the indicator displayed immediately previous thereto.

3. The obstacle alert device according to claim 2,
wherein the indicator displayed later has a lower level of transparency than the indicator displayed immediately previous thereto.

4. The obstacle alert device according to claim 1,
wherein the indicator is configured in an arrow shape whose point protrudes toward the center of the target captured image.

5. The obstacle alert device according to claim 1,
wherein the notification image output unit is configured to stop the output of the indicator in the case where the object has advanced into a region corresponding to the target captured image.

\* \* \* \* \*